United States Patent [19]
Konig

[11] 3,775,206
[45] Nov. 27, 1973

[54] PROCESS OF MANUFACTURING FOAMED BODIES OF PLASTICS MATERIAL

[76] Inventor: Gustav Konig, Raiffeisenstrasse, Bonlanden/Stuttgart, Germany

[22] Filed: Jan. 22, 1971

[21] Appl. No.: 108,782

[30] Foreign Application Priority Data
Jan. 23, 1970 Germany.............. P 20 02 974.7

[52] U.S. Cl............. 156/78, 156/79, 161/160, 161/206, 161/170, 161/162, 161/176, 260/2.5 A, 260/2.5 AK, 260/2.5 BD
[51] Int. Cl............................................. B32b 5/18
[58] Field of Search................. 161/DIG. 5, 190, 161/159, 160, 206, 162, 170, 176, 165; 156/78, 79, 77; 260/2.5 A, 12.5 AK

[56] References Cited
UNITED STATES PATENTS

| | | | |
|---|---|---|---|
| 3,510,392 | 5/1970 | D'Eustachio et al. | 161/162 |
| 3,503,840 | 3/1970 | Parrish | 161/159 |
| 3,598,672 | 8/1971 | Heller | 161/160 |
| 3,316,139 | 4/1967 | Alford et al. | 161/162 X |

Primary Examiner—Alfred L. Leavitt
Assistant Examiner—C. B. Cosby
Attorney—Spencer & Kaye

[57] ABSTRACT

Foamable plastics material is introduced into and foamed freely in a freely flowable, particulate lightweight solid receiving material to form foamed bodies.

19 Claims, 5 Drawing Figures

PATENTED NOV 27 1973

INVENTOR
Gustav König

BY *Spencer & Kaye*

ATTORNEYS.

PROCESS OF MANUFACTURING FOAMED BODIES OF PLASTICS MATERIAL

BACKGROUND OF THE INVENTION

This invention relates to a process of manufacturing bodies of foamed plastics material, preferably of polyurethanes.

Foamed bodies are known which consist of polystyrene, foamed glass, expanded clay and various other materials, such as expanded minerals. These materials are mainly expanded by a sudden treatment with heat or steam. The resulting foamed bodies are often used as aggregates in lightweight concrete in which cement or synthetic resin is used as a binder, or for leaning other foams, particularly of polyurethanes and polyesters.

Foamed bodies made from glass or clay are inelastic and cannot be used in the manufacture of pressed sandwich elements or shaped bodies. On the other hand, bodies of foamed polystyrene are elastic but have the disadvantage that they cannot be processed together with styrene-containing resins or binders. Styrene-free resins are much more expensive than styrene-containing synthetic resins. Beads of foamed polystyrene have been foamed mainly with the aid of water vapor so that they may contain water. Besides, these beads tend to consume a large quantity of resin unless they have been subjected to a special pretreatment.

Such prefoamed polystyrene beads are mainly used as an aggregate for cement-bonded lightweight concretes. They have the disadvantage that their small diameter requires the use of the binder in very thin layers if a low specific gravity is to be obtained. As a result, their use as aggregates of large particle size is not satisfactory. Furthermore, these polystyrene beads cannot be mixed and processed in various particle sizes selected to provide an optimum grading curve, which results in a high volume of aggregate, because the diameter of said foamed beads can only be varied within a small range.

Whereas it is also known to produce molded foamed bodies, such a manufacturing process is too expensive for the manufacturing of large quantities. When, e.g., polyurethanes or polyesters are caused to foam freely, without being confined in a mold, the resulting foams will consist of flat cakes, which hardly can be used as aggregates. This disadvantage can only be avoided by foaming the material in hollow bodies or out of slots.

SUMMARY OF THE INVENTION

The invention provides a process of manufacturing bodies of foamed plastics material, preferably of polyurethanes. In this process the foamable material (mixture of resin and foaming agent) is introduced, e.g., in the form of drops, into a lightweight receiving material, e.g., into polystyrene beads or aerodial silica. The resulting ball- or bulb-shaped foamed bodies can be varied within a wide range, preferably from 5 to 100 millimeters, by a control of the amount of foamable material (mixed ingredients) introduced into the lightweight receiving material, by the selection of the nature of the receiving material (e.g., fibrous or granulated nature, specific gravity, thermal conductivity, and the like) and/or the condition of the foamable material (mixed ingredients), e.g., by a supply of heat or moisture. The hardness, elasticity, and plasticity of the foamed bodies may also be widely varied by the selection of a suitable foamable material or by admixing, e.g., quartz powder or short fibers to the foamable material.

These bodies of foamed plastics material provided by the invention consist preferably of polyurethanes and have been foamed freely in a lightweight receiving material and can be used for various purposes as fillers and aggregates. The manufacture of these bodies is simple and inexpensive because only a small amount of material is required.

For a full understanding of the invention, the same will now be explained with reference to the accompanying drawings.

DESCRIPTION OF THE PREFERRED EMBODIMENTS

Figure 1:
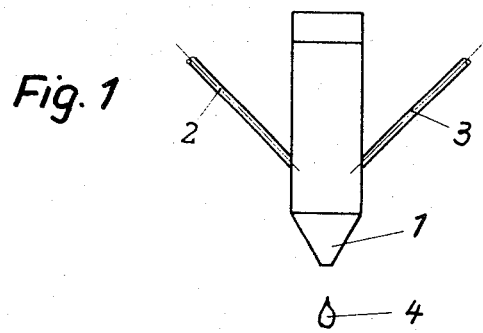
FIG. 1 is a diagrammatic view illustrating a manufacturing process.
Figure 1:
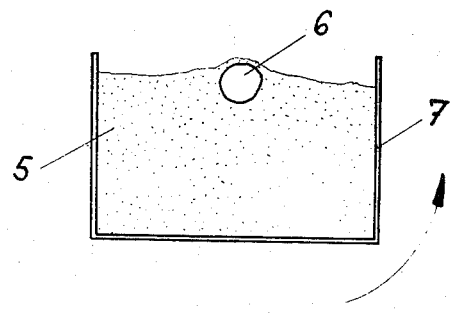

With reference to FIG. 1, a foaming agent 2 and a resin 3 are introduced through a metering or dropping nozzle 1 or through an injecting nozzle. The ingredients 2, 3 are discharged from the nozzle 1 in the form of a drop 4, which falls into a lightweight receiving material 5, which consists, e.g., of polystyrene beads or aerodial silica and in which the foamable material is foamed freely to form a body 6 which resembles a ball or bulb. The container 7 continues to move, e.g., to rotate, so that the next drop 4 can again foam freely. The container 7 may consist, e.g., of a rotating annular trough from which the foamed balls or bulbs 6 can be removed by means of a rake or fork during the rotation of the trough whereas substantially all of the lightweight receiving material 5 is a left back. Instead of the trough 7, the metering, dropping or injecting nozzle 1 may be moved or both parts 1 and 7 may be moved.

Figure 2:
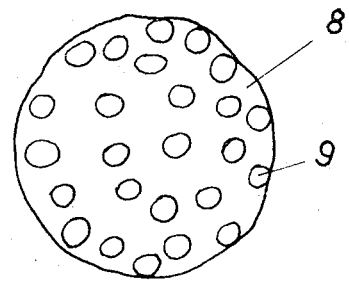
FIG. 2 shows a foamed body in which polystyrene balls are embedded.

The receiving material may be used as a covering or reinforcing material and may result in an incorporation, e.g., of polystyrene beads or asbestos fibers in the foamed body. For instance, FIG. 2 shows a foamed body 8 in which balls 9 of polystyrene have been incorporated.

Figure 3:
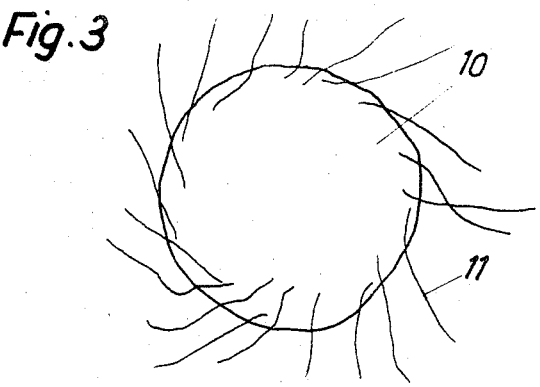
FIG. 3 shows a foamed body provided at its surface with glass fibers.

Reinforcing fibers, e.g., of glass or asbestos, may be included in the receiving material and these fibers then extend entirely or in part through the foamed body or from the surface thereof. For instance, FIG. 3 shows glass fibers 11 extending from the surface of a foamed body 10.

Figure 4:
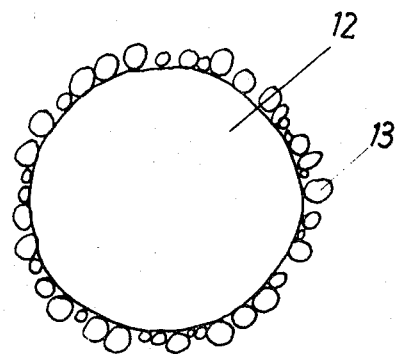
FIG. 4 shows a foamed body provided at its surface with foamed glass particles.
Figure 5:
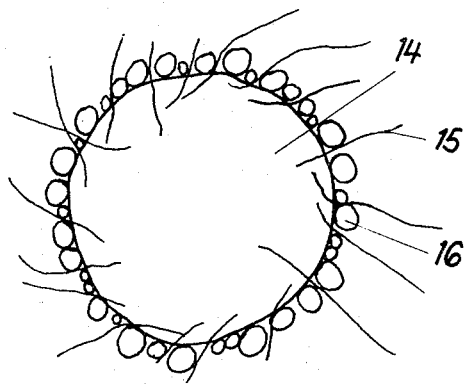
FIG. 5 shows a foamed body which is provided with glass fibers and reinforcing particles.

FIG. 4 shows by way of example a foamed body 12 and small bodies 13 of foamed glass extending from the surface of the body 12. FIG. 5 shows a foamed body 14 provided with glass fibers 15 and small reinforcing bodies 16.

The auxiliary material may be provided with additions, such as foamed glass, expanded clay, fillers or reinforcing materials, which extend entirely or in part through the foamed body or from the surface thereof. The auxiliary material may be dyed or may contain color pigments, e.g., in the form of a powder, which impart a color to the foamed body.

The auxiliary material may be provided with admixed binders, such as adhesive granules, thermoplastic or thermosetting plastics material, particularly in the form of a powder, which binders are desired in a subsequent processing, which may comprise a pressing or rolling operation and in which the foamed bodies may be transformed into shaped bodies, e.g., with the aid of water, heat, pressure or solvent. The foamed bodies may be subjected to further processing when they are not yet completely cured, e.g., when their surface is still adhesive, and reinforcing or sound-insulating inserts in the form of fibers or granules or as solid fillers, such as quartz sand or foamed glass, may be provided between foamed bodies which are bonded to form shaped bodies.

What is claimed is:

1. A process of manufacturing foamed bodies, which comprises:

dispensing individual quantities of a foamable plastics material from a dispenser into a freely flowable, particulate lightweight solid receiving material; and separately freely foaming each individual quantity of foamable material in an excess of the receiving material to form an individual foamed body containing both a foam and a particulate material, and maintaining the individual bodies separate from each other while they substantially solidify.

2. A process as set forth in claim 1, in which said foamable plastics material comprises polyurethane.

3. A process as set forth in claim 1, in which said receiving material contains reinforcing fibers, which are bonded to said foamed bodies as said foamable material is foamed.

4. A process as set forth in claim 3, in which said reinforcing fibers comprise glass fibers.

5. A process as set forth in claim 3, in which said reinforcing fibers comprise asbestos fibers.

6. A process as set forth in claim 1, in which said receiving material contains admixtures which are bonded to said foamed bodies as said foamable material is foamed.

7. A process as set forth in claim 22, in which said admixtures comprise foamed glass.

8. A process as set forth in claim 22, in which said admixtures comprise reinforcing materials.

9. A process as set forth in claim 1, in which said receiving material consists at least in part of a lightweight binder which is bonded to said foamed bodies as said foamable material is foamed.

10. A process as set forth in claim 9, in which said binder consists of flakes of adhesive.

11. A process as set forth in claim 9, in which said binder consists of flakes of synthetic thermoplastics.

12. A process as set forth in claim 9, in which said binder consists of flakes of a thermosetting synthetic material.

13. A process as set forth in claim 9, in which said binder consists of adhesive granules.

14. A process as defined in claim 1 wherein said step of dispensing individual quantities of foamable material is carried out by dispensing each individual quantity of foamable material in the form of a drop.

15. A process as defined in claim 14 further comprising producing relative movement between the dispenser and the receiving material during dispensing to permit each quantity of foamable material to foam freely while being separated from the previously dispensed quantity of foamable material.

16. A process as defined in claim 1 wherein each individual foamed body is in the form of a ball-shaped body.

17. A process as defined in claim 1 wherein each individual foamed body is in the form of a bulb-shaped body.

18. A process as defined in claim 1 wherein the properties and the size of the individual foamed bodies are set by selecting the shape and composition of the receiving material particles.

19. A process as defined in claim 1 wherein the receiving material contains additions which become attached to the individual foamed bodies during foaming.

* * * * *